United States Patent
Zhou

(10) Patent No.: US 11,395,065 B2
(45) Date of Patent: *Jul. 19, 2022

(54) AUDIO DEVICE, AUDIO SYSTEM, AND AUDIO PROCESSING METHOD

(71) Applicant: KIKAGO LIMITED, Hong Kong (HK)

(72) Inventor: Chao Zhou, Shanghai (CN)

(73) Assignee: KIKAGO LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,949

(22) Filed: Jun. 9, 2020

(65) Prior Publication Data
US 2020/0351584 A1 Nov. 5, 2020

Related U.S. Application Data

(63) Continuation-in-part of application No. 16/241,942, filed on Jan. 7, 2019, now Pat. No. 10,728,656.

(51) Int. Cl.
*H04R 5/04* (2006.01)
*H04R 5/027* (2006.01)
(Continued)

(52) U.S. Cl.
CPC .......... *H04R 3/005* (2013.01); *G10L 19/167* (2013.01); *H04L 65/601* (2013.01);
(Continued)

(58) Field of Classification Search
CPC ......... G10L 19/167; G10L 2021/02082; G10L 2021/02165; G10L 21/0208; H04L 65/403;
(Continued)

(56) References Cited

U.S. PATENT DOCUMENTS

2002/0173338 A1* 11/2002 Neumann ............. H04M 1/725
455/552.1
2003/0081935 A1 5/2003 Kirmuss
(Continued)

*Primary Examiner* — Vivian C Chin
*Assistant Examiner* — Friedrich Fahnert
(74) *Attorney, Agent, or Firm* — Anova Law Group, PLLC

(57) ABSTRACT

An audio device, an audio system, and an audio processing method that implement noise (echo) cancellation techniques are provided. The audio device includes a primary microphone(s) that is arranged closer to a desired sound source and configured to collect first audio signals containing more of target audio signals. In addition to the primary microphone(s), an auxiliary microphone(s) is arranged away from the desired sound source and configured to collect second audio signals containing less of the target audio signals. A microcontroller is configured to process the first audio signals and the second audio signals to generate a data stream. An encoding scheme(s) is implemented in encoding the audio signals, optionally with to-be-played audio signals outputted to a loudspeaker, into the data stream. At least one multi-input audio processing algorithm(s) is applied to the data stream to arrive at an accurate interpretation and/or comprehension of the audio signals or an improvement of human-to-human voice communications.

20 Claims, 7 Drawing Sheets

(51) Int. Cl.
    *H04L 65/80*     (2022.01)
    *H04R 3/00*      (2006.01)
    *G10L 19/16*     (2013.01)
    *H04L 65/60*     (2022.01)
    *H04L 29/06*     (2006.01)

(52) U.S. Cl.
    CPC ............ *H04L 65/607* (2013.01); *H04L 65/80* (2013.01); *H04R 5/027* (2013.01); *H04R 5/04* (2013.01); *H04R 2420/09* (2013.01)

(58) Field of Classification Search
    CPC ... H04L 65/601; H04L 65/605; H04L 65/607; H04L 65/80; H04R 1/1083; H04R 1/406; H04R 2201/403; H04R 2410/05; H04R 2420/07; H04R 2420/09; H04R 2460/01; H04R 2499/11; H04R 3/005; H04R 5/027; H04R 5/04
    USPC .......................................................... 381/26
    See application file for complete search history.

(56) References Cited

U.S. PATENT DOCUMENTS

| | | |
|---|---|---|
| 2009/0003619 A1 | 1/2009 | Solow |
| 2011/0075858 A1 | 3/2011 | Chihara |
| 2012/0087512 A1 | 4/2012 | Said et al. |
| 2015/0245127 A1 | 8/2015 | Shaffer |
| 2017/0295429 A1 | 10/2017 | Poletti |
| 2019/0042185 A1 | 2/2019 | Young |
| 2019/0088268 A1* | 3/2019 | Gether ................... H04R 3/005 |
| 2019/0208322 A1* | 7/2019 | Chapman ................. H04R 3/04 |

\* cited by examiner

Ambient Noise

Ambient Noise

101

102 Ambient Noise

102
Ambient Noise

AUDIO DEVICE, AUDIO SYSTEM, AND AUDIO PROCESSING METHOD

CROSS-REFERENCE

This application is a continuation-in-part (CIP) application of U.S. application Ser. No. 16/241,942, entitled "Audio Device and Audio Processing Method," filed on Jan. 7, 2019, the entire content of which is incorporated herein by reference.

FIELD OF THE DISCLOSURE

The present disclosure relates to the field of audio processing technologies and, more particularly, relates to an audio device, an audio system, and an audio processing method that implement noise (echo) cancellation techniques.

BACKGROUND

Human-machine interaction (HMI) is playing a vital role nowadays. HMI may refer to the communication and interaction between a human and a machine via a user interface. Portable electronic devices, such as mobile phones, have become a very popular user interface for this interaction.

For example, a relatively common application for HMI is motivated by a desire to operate or talk on a mobile phone while driving. However, using a hand to operate on a mobile phone while driving is generally considered as an unsafe practice and a rule-violation behavior in most of the countries. In order to address this issue, various methods have been introduced to reduce or eliminate driver's manual operations on a mobile phone. Among the methods, one possibility is to implement voice control functionality so that voices of a user can be recognized and converted into operations on the mobile phone.

The ASR (Automated Speech Recognition) engines that are configured to transform human voices into texts are widely applied to HMI. As the ASR engines used in the art for human voice recognition are trained by a large quantity of human speech materials, but mainly collected in a non-noisy background, their performances are usually compromised when the to-be-recognized audio signals contain both desired user voices and all kinds of noises. For a correct interpretation and/or comprehension of the voices of the user, reducing noises from the collected audio signals before sending the same to the ASR engines to avoid misinterpretation is becoming important in HMI.

Noise cancellation (NC) techniques are also considered necessary in many other occasions to reduce unwanted ambient sounds. For example, in a conference call with plural participants from different locations, ambient noises from any of the locations would pollute the quality of the whole conference call and therefore affect the experiences of all the participants. How to reduce noises from audio signals captured by microphone(s) while conserving the desired speech brings a challenge in the art.

In another example, when the user uses loudspeaker(s) in addition to the microphone(s) in HMI or in a telephone/conference call, another unfavorable element, commonly referred as "echo" in the art, often affects the quality of the speech recognition and the user experiences. More specifically, the audio being played by the loudspeaker(s) of the audio device to the ambience, usually containing the speech formulated by a machine in HMI or from a distant participant(s) in the conference call, will be partly re-captured by the microphone(s) of the same audio device. The unwanted audio signal (echo) is mixed with the desired human voice and then transmitted to the machine or the distant participant(s). In an extreme case when there are two participants(s) of a call, both using the above-described audio devices with loudspeaker(s) and setting their own audio gains to a certain level, it may cause an ultra-annoying phenomenon, i.e., "howling." Effective techniques to reduce the impact of echo, commonly referred as Acoustic Echo Cancellation (AEC), in such a scenario, is also a major challenge in the art. Many algorithms are developed for the same purpose.

Some people in the art may consider echo as part of the ambient noises, and the AEC techniques can be accordingly regarded as a particular kind of Noise Cancellation (NC). In the descriptions hereinafter, to reflect this concept and to avoid any misunderstanding, the term "noise" by itself does not exclude the notion of echo; and the term "NC" by itself does not exclude the notion of AEC.

FIG. 1 illustrates a structural diagram of an existing audio device in the art. The existing audio device includes one microcontroller embedded in a same device that hosts a microphone or a microphone array of multiple microphones. As shown in FIG. 1, audio signals collected by the microphone array is transmitted and received by the microcontroller. The microcontroller includes or connects with a hardware digital signal processing (DSP) module/a Graphics Processing Unit (GPU) to process the audio signals collected by the microphone array locally. Noise cancellation (NC) and/or echo cancellation algorithm(s) (e.g., AEC) is implemented in an audio processing scheme embedded in the hardware DSP module/GPU or the microcontroller to reduce noises and/or echo from the collected audio signals.

Such kind of architecture, however, brings two major drawbacks. First, the microcontroller (with the embedded or connected DSP/GPU) is required to provide the sufficient computing power and memory space for the NC/AEC algorithm(s). An extra hardware DSP module/GPU, either included or connected, requires costs, occupies a physical space, and generates heat. By consequence, there exists a trade-off between choosing a higher performance of algorithm or lower hardware costs with a smaller device size. Further, as most NC/AEC algorithms perform calculations on the time alignment at a micro-second level between different signals, it becomes essential for the algorithms to be implemented in the same real-time computing system with the microphones, which limits the flexibility of the design. Sometimes, the microcontroller is required to be exclusively dedicated to executing the audio processing scheme (e.g., one processing thread consuming 100% of a computing power) to ensure the real-time processing, and the microcontroller is therefore not available to execute other tasks. As a result, the performance-cost ratio of noise cancellation of such a design is not satisfactory, thereby bringing obstacles to its wide application to the audio device in noisy environments.

Accordingly, the present disclosure provides an audio device, an audio system, and an audio processing method directed to solve one or more problems set forth above and other problems.

BRIEF SUMMARY OF THE DISCLOSURE

An audio device, an audio system, and an audio processing method that implement noise (echo) cancellation techniques are provided. In addition to a primary microphone(s) arranged closer to a desired sound source and configured to collect more of target audio signals, an auxiliary microphone(s) is arranged away from the desired sound source and configured to collect less of the target audio signals. An encoding scheme(s) is implemented in encoding the audio signals, optionally with to-be-played audio signals outputted to a loudspeaker, into one data stream. At least one multi-input audio processing algorithm(s) is applied for process the data stream to have an accurate interpretation and/or comprehension of the audio signals or an improvement on human-to-human voice communication quality.

One aspect of the present disclosure may provide an audio device. The audio device may include at least one first audio acquisition module including at least one microphone. The at least one first audio acquisition module may be arranged near a desired sound source and configured to collect first audio signals. The audio device may further include at least one second audio acquisition module including at least one microphone. The at least one second audio acquisition module may be arranged away from the desired sound source and configured to collect second audio signals. A microcontroller may be configured to process and encode the first audio signals and the second audio signals to generate a data stream, and a device connector port may be compatible with a computing terminal and configured to connect with the microcontroller in a wired/wireless communication for transmitting the data stream to the computing terminal. Each of the at least one first audio acquisition module and the at least one second audio acquisition module may be connected with the microcontroller in a respective wired/wireless communication. The microcontroller may be configured to sample the first audio signals and the second audio signals in parallel. Based on the data stream, the first audio signals may be processed in reference to the second audio signals to generate new audio signals. The first audio signals may include a first portion of audio signals from the desired sound source, and the new audio signals may include a second portion of audio signals from the desired sound source higher than the first portion.

Another aspect of the present disclosure may provide another audio device adapted to selectively connect with another audio device including at least one microphone that is configured to collect first audio signals. The audio device may include at least one audio acquisition module that includes at least one microphone and configured to collect second audio signals. A microcontroller may be configured to process and encode the first audio signals and the second audio signals to generate a data stream. An audio connector port may be configured to selectively connect with the other audio device in a wired/wireless communication. The audio device may further include a device connector port compatible with a computing terminal and configured to connect with the microcontroller in a wired/wireless communication for transmitting the data stream to the computing terminal. The microcontroller may be configured to sample the first audio signals and the second audio signals in parallel. Based on the data stream, the first audio signals may be processed in reference to the second audio signals to generate new audio signals. The first audio signals may include a first portion of audio signals from the desired sound source, and the new audio signals may include a second portion of audio signals from the desired sound source higher than the first portion.

Still another aspect of the present disclosure may provide still another audio device adapted to connect, via at least one audio output port, with at least one loudspeaker that is configured to play a downlink data stream containing to-be-played audio signals. The audio device may include at least one audio acquisition module including at least one microphone and configured to collect audio signals. A microcontroller may be configured to encode the collected audio signals and the to-be-played audio signals in an interleaving manner to generate an uplink data stream. A device connector port, connected with the microcontroller in a wired/wireless communication, may be compatible with a computing terminal and configured to receive the downlink data stream from the computing terminal and transmit the uplink data stream to the computing terminal. The NC/AEC algorithm(s) may be thus applied to process the uplink data stream in the computing terminal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 4-1 illustrates a structural diagram of a third audio device according to the present disclosure;

FIG. 4-2 illustrates a structural diagram of a fourth audio device according to the present disclosure;

FIG. 4-3 illustrates a structural diagram of a fifth audio device according to the present disclosure;

FIGS. 5-1, 5-2, and 5-3 show product embodiments implementing the audio devices illustrated in FIGS. 4-1-4-3;

FIG. 8-1 illustrates a first audio system in the art; and

FIG. 8-2 illustrates a second audio system in the art.

DETAILED DESCRIPTION

Reference will now be made in detail to exemplary embodiments of the preset disclosure, which are illustrated in the accompanying drawings. Hereinafter, embodiments consistent with the present disclosure will be described with reference to the drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a solution to improve the user's experience of using an audio device. In particular, the present disclosure provides an audio device, an audio system, and an audio processing method that implements noise (echo) cancellation techniques to arrive at an accurate interpretation and/or comprehension of audio signals captured by microphones or to improve the experience of distant human-to-human voice communication.

Consistent with the present disclosure, the noise cancellation techniques may be implemented in many manners. In some embodiments, in addition to a primary microphone(s) arranged closer to a target (desired) sound source, typically a user's mouth, an auxiliary microphone(s) may be deployed in the audio device and arranged away from the target sound source. Comparing to the primary microphone(s), it is more likely for the auxiliary microphone(s) to capture ambient noise signals. Accordingly, the audio signals collected by the auxiliary microphone(s) may be regarded as a reference used to cancel noises in the audio signals collected by the primary microphone(s). In some embodiments, a noise cancellation algorithm(s) may be implemented in an audio system including the audio device. By mathematical operations on the audio signals collected by the primary microphone(s) with respect to the audio signals collected by the auxiliary microphone(s) based on the multi-input audio processing schemes, new audio signals, containing mainly sound from the target sound source with noises of a less proportion than that in the audio signals from both the primary or auxiliary microphones, can be generated and used in further processing steps, and negative impacts of the noises in the audio signals can be accordingly attenuated.

According to the present disclosure, a specific encoding scheme(s) may be applied in encoding the audio signals collected from the primary microphone(s) and the auxiliary microphone(s), optionally with to-be-played audio signals outputted to loudspeaker(s), into one data stream to ensure precise timing alignments between the audio signals preserved. Thereby, the NC/AEC algorithms that require a precise timing alignment can be applied to the data stream in a later processing.

Figure 2:
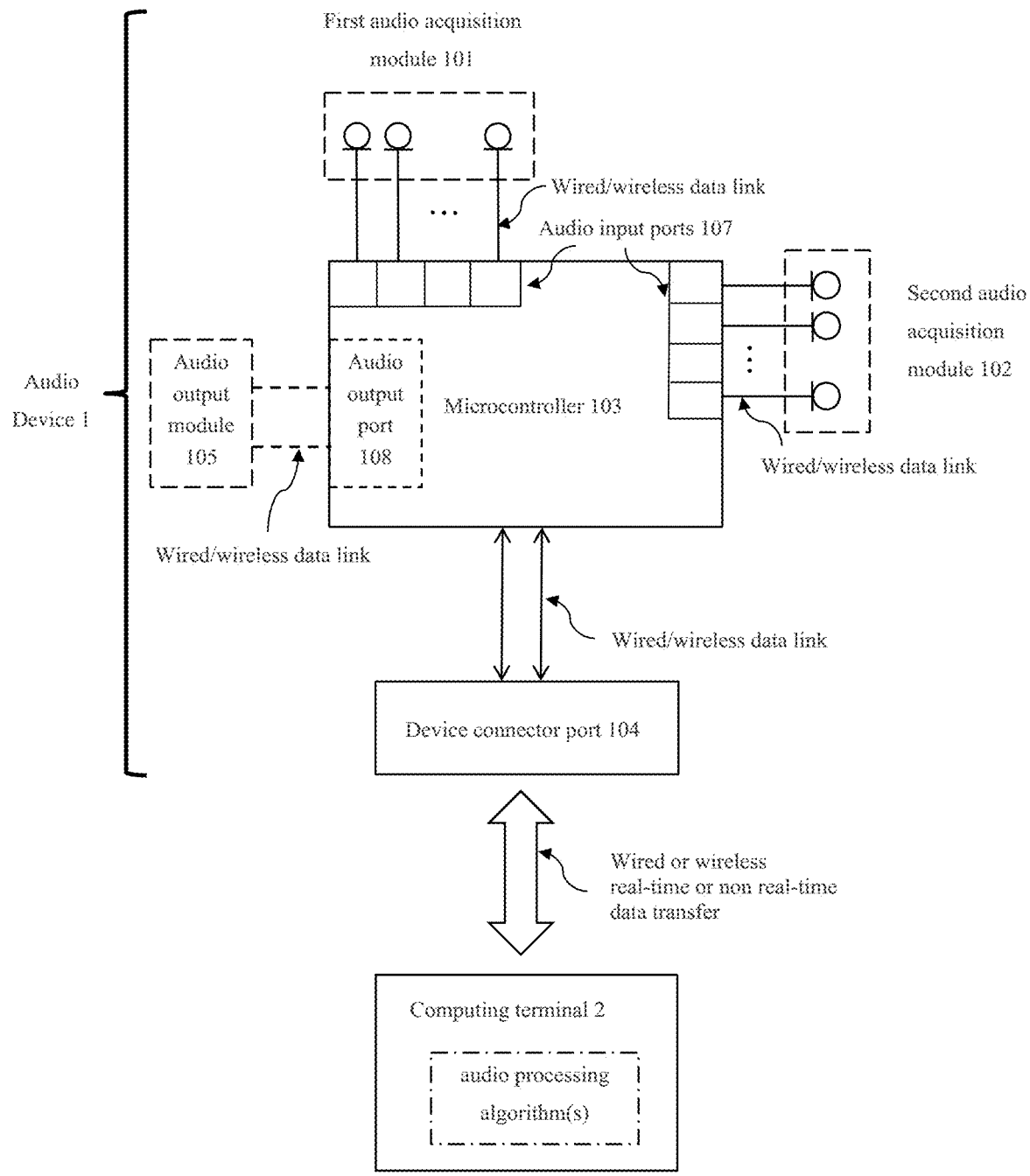
FIG. 2 illustrates a structural diagram of a first audio device with respect to a computing terminal according to the present disclosure.

FIG. 2 illustrates a structural diagram of a first audio device according to the present disclosure. The audio device 1 may include a plurality (at least two) of audio acquisition modules 101, 102 configured to collect audio signals, and a microcontroller 103. Each of the audio acquisition modules 101, 102 may be connected with the microcontroller 103 in a respective wired/wireless manner.

As shown in FIG. 2, the audio device 1 may also include a device connector port 104 configured to communicate with a computing terminal 2 in a wired/wireless and real-time/non-real-time connection. The device connector port 104 may be connected with the microcontroller 103 also in a wired/wireless manner. In some embodiments, the audio device 1 may further include an audio output module 105 (e.g., a speaker(s)), and the audio output module 105 may be connected with the microcontroller 103 in a wired/wireless manner.

The device connector port 104 may be an interface for connecting the audio device 1 and the computing terminal 2. In some embodiments, the device connector port 104 may support a wired connection with the computing terminal 2 via any type of interface compatible with the computing terminal 2, such as Universal Serial Bus (USB, including type-B plug, Mini-B plug, Micro-B plug, Type-B Super-Speed plug, Type-C plug, lightning connector, etc.), High-Definition Multimedia Interface (HDMI), DisplayPort (DP), audio jack, or any customized connector. The microcontroller 103 may send or receive data from the computing terminal 2 through the device connector port 104 based on a standard wired data transfer protocol (e.g., USB data transfer protocol). In some embodiments, the device connector port 104 may support wireless communication with the computing terminal 2. For example, the device connector port 104 may include wireless communication module supporting a standard wireless communication protocol, such as 2.4 GHz wireless, Ultra-High Frequency (UHF), Wi-Fi or Bluetooth.

The microcontroller 103 may be configured to digitally encode the audio signals captured by the audio acquisition modules 101, 102 to generate a digital data stream. The microcontroller 103 may include any appropriate processor or processors. In some embodiments, the microcontroller 103 may include multiple cores for multi-thread or parallel processing. In some embodiments, the microcontroller 103 may include a digital signal processor (DSP) module and/or an audio codec module.

In some embodiments, the microcontroller 103 may be configured to send the data stream to the computing terminal 2 using a USB data transfer protocol. The audio device 1 may be configured to support both standard USB data transfer protocol and standard USB charging scheme, such as USB On-The-Go (OTG) and USB Power Delivery (PD). It can be understood that USB protocol is an example of digital audio signal protocols in the present disclosure. Any other proper wired or wireless communication protocol can be implemented with same principles, as long as the communication protocol and corresponding hardware interface satisfy a preset bandwidth lower limit and does not expect to have regular transmission congestion, such as HDMI, DP, serial port connection protocol, I2S (Inter-IC Sound) protocol, SPI (Serial Peripheral Interface), Bluetooth Low Energy communication protocol, etc.

The device connector port 104 may be connected with (e.g., plugged into) a compatible connector port of the computing terminal 2. The computing terminal 2 may be a smart phone, a personal digital assistant (PDA), a tablet, a laptop, a personal computer (PC), a TV or TV box, an industrial computer and so on. The microcontroller 103 may be connected with all of the audio acquisition modules 101, 102 and process the audio signals captured from the audio acquisition modules 101, 102 to generate the data stream. The data stream may be transmitted to the computing terminal 2 through data link pins of the device connector port 104, such as D+ pin and D− pin in a USB connector.

Consistent with the present disclosure, one or more encoding schemes may be applied to the collected audio signals to ensure precise timing alignments of the audio signals so as to improve the performance of the later-applied multi-input audio processing schemes. Considering the sound speed traveling in the atmosphere (i.e., 340 m/s) and a spatial scale of the audio acquisition module (e.g., a typical distance between two microphones in a same audio acquisition module, normally in a centimeter order), a time difference of audio signals generated by a same sound source and received by different microphones can be in a range of microseconds. As a result, the multi-input audio processing schemes as applied should be accurate enough to detect the time difference in the range of microseconds. That implies that a misalignment of the collected audio signals may corrupt the accuracy of the multi-input audio processing schemes. Therefore, by applying the encoding scheme(s) to the collected audio signals before further analyses, it can be ensured that the multi-input audio processing schemes meet the requirement. The details of the encoding schemes will be explained later.

As shown in FIG. 2, each of the audio acquisition modules 101, 102 may include at least one microphone. In some of the following descriptions, "an audio acquisition module" may identically refer to "at least one microphone" contained in the audio acquisition module.

The at least one microphone in the audio acquisition modules 101, 102 may include at least one digital microphone configured to generate digital audio signals and/or at least one analog microphone configured to generate analog audio signals. In some embodiments, the at least one microphone in the audio acquisition modules 101, 102 may include at least one microphone. In some embodiments, the at least one microphone in a first audio acquisition module 101 may be identical, in their properties, attributes, and models, to the at least one microphone in a second audio acquisition module 102. In such an embodiment, a same sound source can be recorded with most same/similar properties (e.g., frequency response, resonance, tone, etc.) by different microphones, so that negative impacts on the performance of the multi-input audio processing schemes can be accordingly reduced.

In some embodiments, the audio device 1 may further include other components configured for performing some specific purposes. For example, when the collected audio signals contain analog signals, the audio device 1 may further include an Analog-to-Digital converter (ADC) (not shown) configured to convert the analog audio signals into digital audio signals. The ADC may be embedded in the microcontroller 103 or included in the audio acquisition modules 101, 102. In some embodiments, the audio device 1 may also include an amplifier (not shown) that is embedded in the microcontroller 103 or arranged in the audio acquisition modules 101, 102. The amplifier may be configured to increase an amplitude of some or all of the audio signals collected by the audio acquisition modules 101, 102. In some embodiments, the computing terminal 2 may include at least a portion of the second audio acquisition module 102 that is configured to communicate with the microcontroller 103 through the device connector port 104.

In some embodiments, some or all components of the audio acquisition modules 101, 102 may be integrated in a same printed circuit board (PCB) of the microcontroller 103. In some embodiments, one or more of the audio acquisition modules 101, 102 may be configured at a location different from the microcontroller 103 and connected with the microcontroller 103 in a wired or wireless manner, as shown in FIG. 4-1, 4-2, or 4-3.

As noted, geometric configurations of the audio acquisition modules 101, 102 can affect actual time stamps of audio contents produced by a same sound source and received by the at least one microphone of the audio acquisition modules 101, 102. Based on the different time stamps along with other information, properties of the sound source may be identified to further enhance a desired audio content and/or reduce unwanted audio contents.

Figure 3:
FIG. 3 illustrates a configuration of multiple audio acquisition modules in a second audio device according to the present disclosure.
Figure 3:
Figure 3:
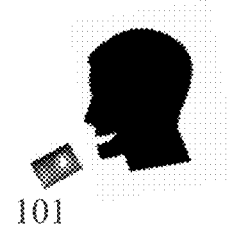
Figure 3:
Figure 3:
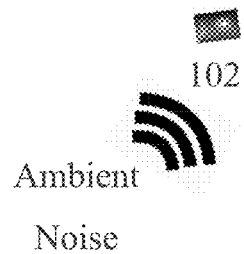

It can be understood that, although only one first audio acquisition module 101 and only one second audio acquisition module 102 are depicted in FIG. 2, a number of the audio acquisition modules 101, 102 may be flexibly adjusted. For example, as shown in FIG. 3, one or more of the first audio acquisition module 101 may be deployed closer to a target (desired) sound source, such as a user's mouth, and may be configured to collect first audio signals. One or more of the second audio acquisition module 102 may be arranged away from the target sound source and configured to collect second audio signals. In one example, with respect to the known ambient noise sources, the audio device 1 may include multiple of the second audio acquisition module 102 each arranged closer to one of the ambient noise sources, respectively, as shown in FIG. 3. Comparing to the first audio acquisition module 101 closer to the target source, it is more likely for the second audio acquisition module 102 to capture the noise signals. Accordingly, the second audio signals collected by the second audio acquisition module 102 may be regarded as a reference used to cancel the noises contained in the first audio signals. In some embodiments, based on the data stream, the first audio signals may be processed in reference to the second audio signals to generate new audio signals. The first audio signals may include a first portion of audio signals from the desired sound source, and the new audio signals may include a second portion of audio signals from the desired sound source higher than the first portion.

Figure 1:
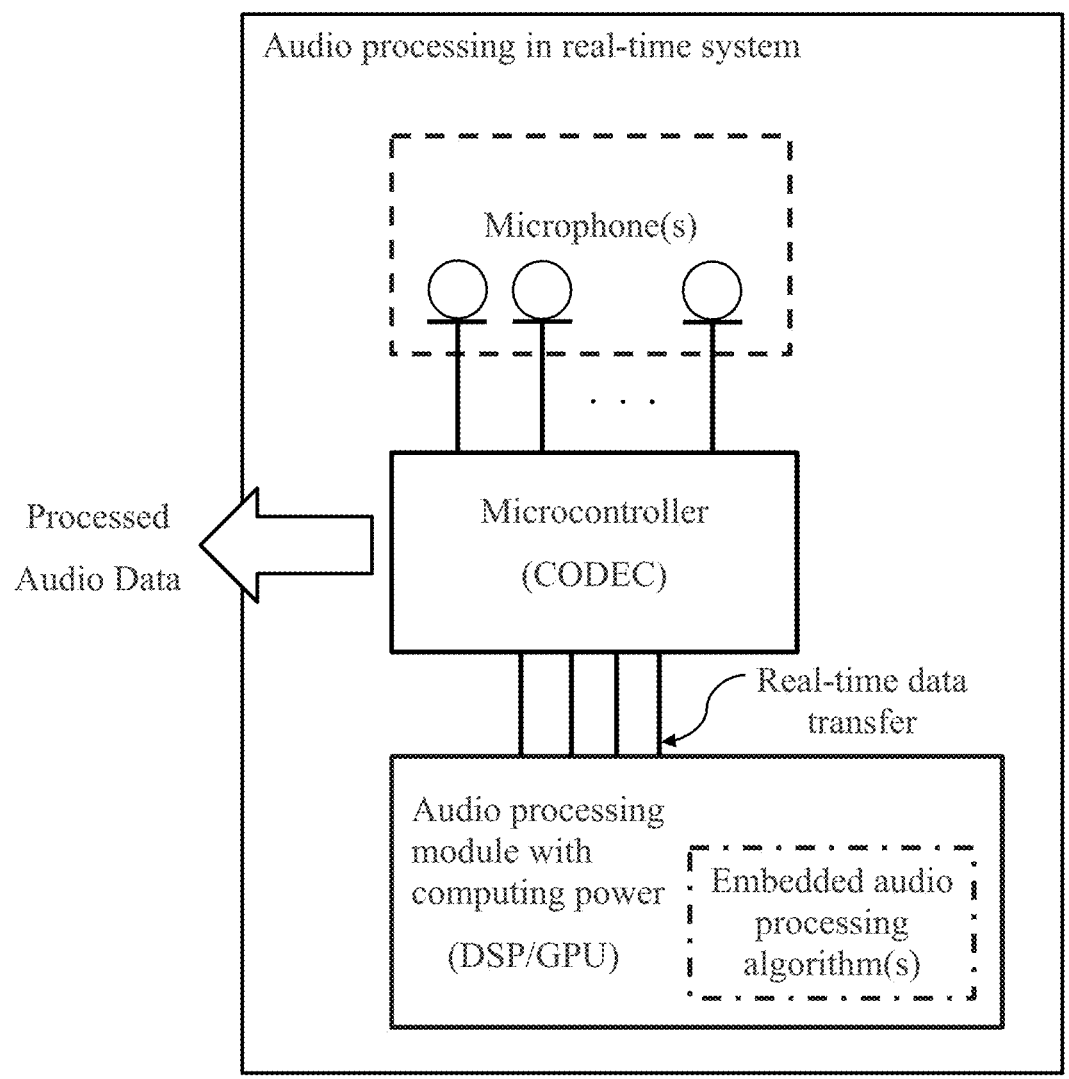
FIG. 1 illustrates a structural diagram of an audio device in the art.

As compared to the single microphone or the single microphone array as shown in FIG. 1, processing of the audio signals collected by the multiple audio acquisition modules 101, 102 may gain more benefits. For example, a diversity of the multi-input audio processing schemes may be applied to process the audio signals collected from the multiple audio acquisition modules 101, 102 so as to generate processed audio signal with less noise component, thereby bringing a better audio/voice recognition result.

In view of various application scenarios, the multi-input audio processing schemes may include at least one of two-microphone noise reduction algorithm, beam forming algorithm, AEC (Acoustic Echo Cancellation), or a similar algorithm. A multi-input audio processing scheme, as used hereinafter, may refer to a processing technique or an algorithm for processing (decoding) the audio signals collected by the multiple audio acquisition modules 101, 102. Consistent with the present disclosure, the multi-input audio processing schemes may be implemented in a hardware device of the audio system or in a software application of the audio system.

It should be also noted that, although FIG. 2 shows that each of the first audio acquisition module 101, the second audio acquisition module 102, and the device connector port 104 is connected with the microcontroller 103 in solid connections (lines), a respective communication of the first audio acquisition module 101, the second audio acquisition module 102, and the device connector port 104 with the microcontroller 103 may be in a wired communication or in a wireless communication. Moreover, at least one of the first audio acquisition module 101, the second audio acquisition module 102, or the device connector 104 may be formed or integrated with the microcontroller 103 as one physical body.

Figures 1, 4:
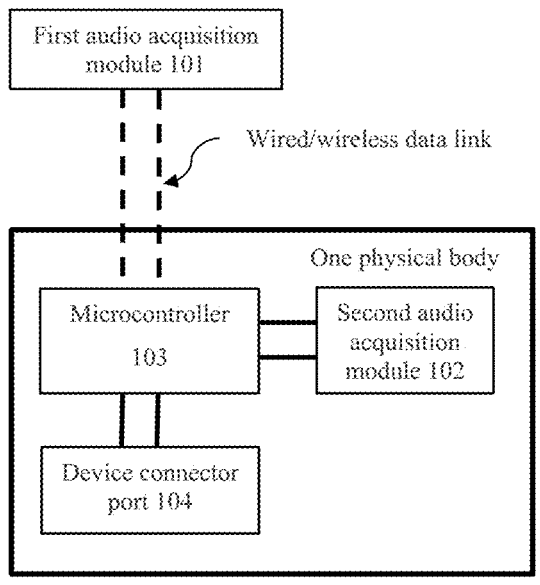
Figures 2, 4:
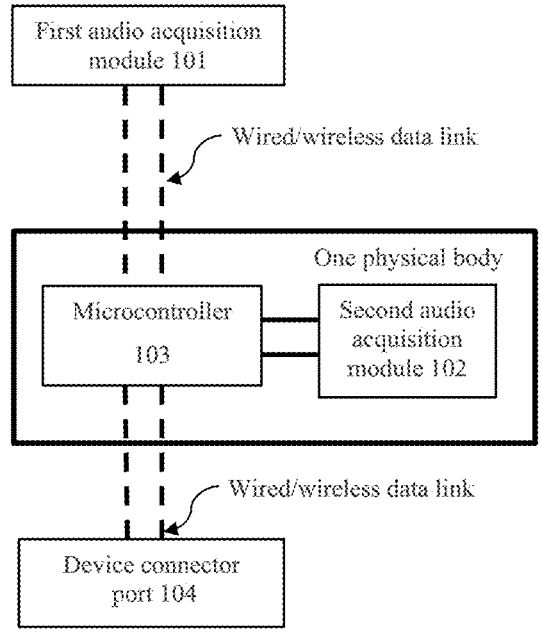
Figures 3, 4:
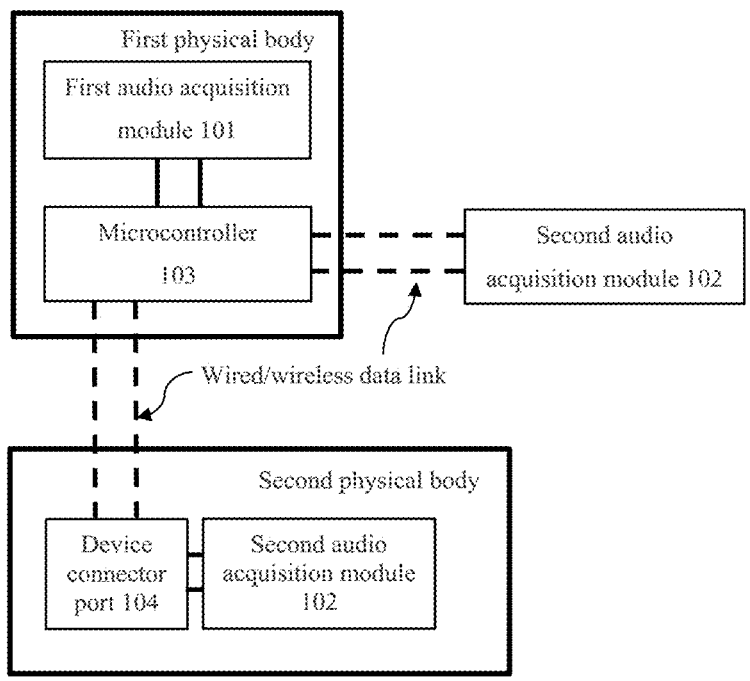

FIG. 4-1 illustrates a structural diagram of a third audio device according to the present disclosure. In the audio device shown in FIG. 4-1, the second audio acquisition module 102 (configured to collect more of the noise signals) and the device connector port 104 may be formed or integrated with the microcontroller 103 in one physical body, while the first audio acquisition module 101 (configured to collect more of the target audio signals) may be arranged remote from and connected with the microcontroller 103 in a wired connection (e.g., via a cable) or in a wireless connection. The audio device consistent with the structure of FIG. 4-1 can provide extra audio signals highly probable to be captured (by the second audio acquisition module 102) at somewhere rather different from that of the audio signals captured by the first audio acquisition module 101 as a user may rarely place the mouth very close to the computing terminal 2 in using an audio accessory. This point is essential for the performance of certain commonly used NC algorithms. In some embodiments, a detailed mechanical/physical design of the physical body containing both the second audio acquisition module 102 and the device connector port 104 may be ensured, according to physical properties of the computing terminal 2, that sound input ports of the microphone(s) in the second audio acquisition module 102 are not likely to be physically covered by any obstacles.

FIG. 4-2 illustrates a structural diagram of a fourth audio device according to the present disclosure. In the audio device of FIG. 4-2, the second audio acquisition module 102 (configured to collect more of the noise signals) may be formed or integrated with the microcontroller 103 as one physical body, while the device connector port 104 and the first audio acquisition module 101 (configured to collect more of the target audio signals) may be each arranged remote from and connected with the microcontroller 103 in a respective wired/wireless connection. FIG. 4-3 illustrates a structural diagram of a fifth audio device according to the present disclosure. In the audio device of FIG. 4-3, the first audio acquisition module 101 (configured to collect more of the target audio signals) may be formed or integrated with the microcontroller 103 as a first physical body, and a first one of the second audio acquisition module 102 (configured to collect more of first noise signals) may be formed or integrated with the device connector port 104 as a second physical body. A second one of the second audio acquisition module 102 (configured to collect more of second noise signals) may be arranged remote from the microcontroller 103 and the device connector port 104 and connected with the microcontroller 103 in a wired/wireless communication. The first physical body and the second physical body may be connected in a wired/wireless communication. As shown in FIG. 4-3, the second one of the second audio acquisition module 102 may communicate with the microcontroller 103 through the device connector port 104 or directly communicate with the microcontroller 103 in a wired/wireless communication.

FIGS. 4-1~4-3 are several embodiments to show possible configurations and connections of the first audio acquisition module 101, the second audio acquisition module 102, the microcontroller 103, and the device connector port 104 consistent with the present disclosure. However, it can be understood that the exemplary embodiments shown in FIGS. 4-1-4-3 do not limit and exclude any audio devices of different configurations and connections.

Figures 1, 5:
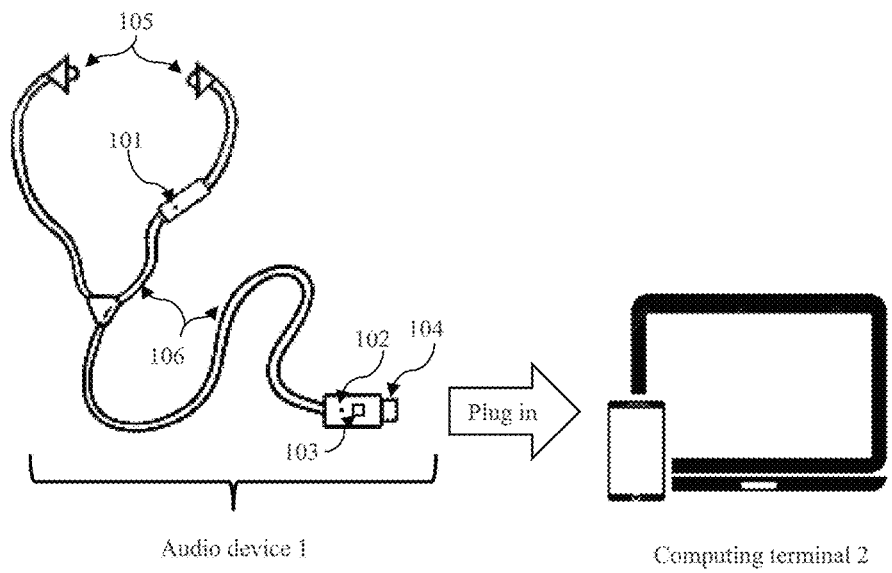
Figures 2, 5:
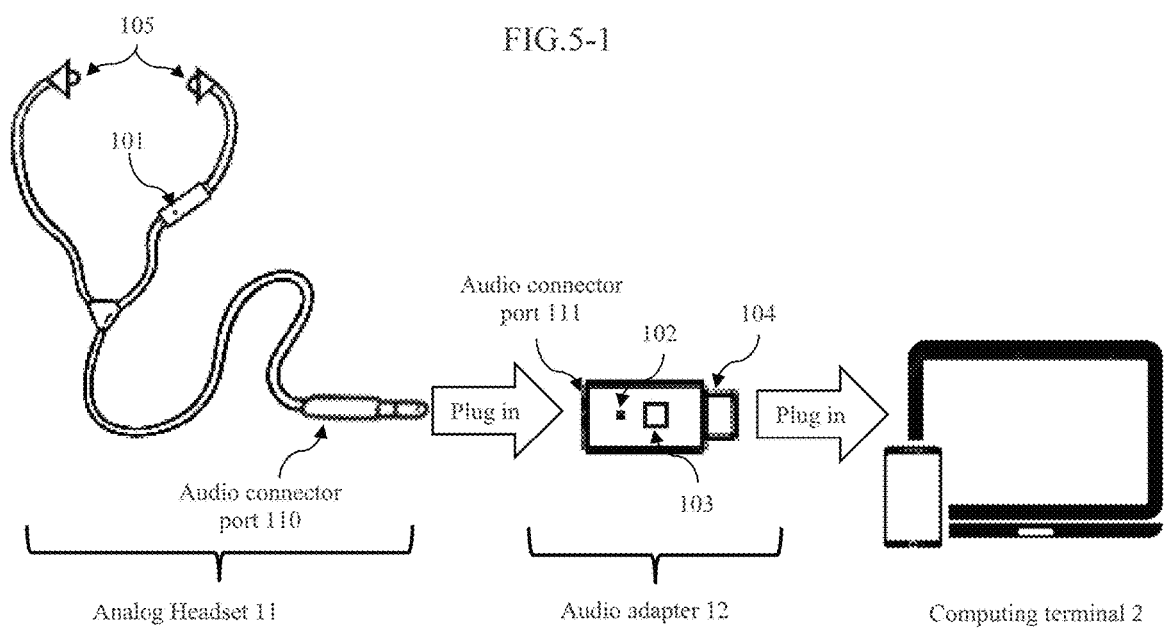
Figures 3, 5:
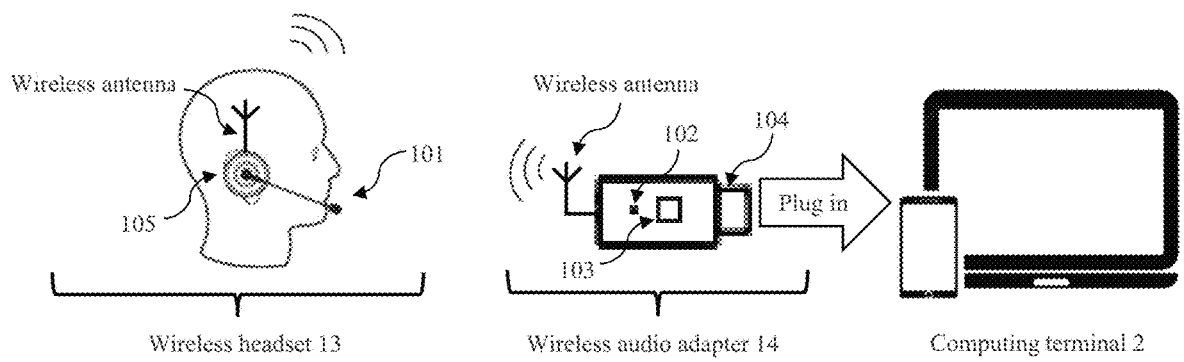

FIGS. 5-1, 5-2, and 5-3 show some product embodiments implementing the audio devices illustrated in FIGS. 4-1~4-3 as examples. FIG. 5-1 shows the audio device 1 (including the first audio acquisition module 101, the second audio acquisition module 102, the microcontroller 103, the device connector port 104, and the audio output module 105) may be formed or integrated as a headset (or an earphone). The headset/earphone, as used hereinafter, may refer to an electronic device that includes at least one speaker close to a user's ear(s), and at least one microphone close to a user's mouth for capturing the user's audio/voice signals. In some embodiments, the headset may be a digital headset, and the device connector port 104 may be a digital audio port, such as an HDMI connector port, a DisplayPort (DP) port, etc., configured to communicate with the computing terminal 2. In some embodiments, the headset may be a USB headset that supports USB data transfer protocol, and the device connector port 104 may be a USB connector port configured to communicate with the computing terminal 2. Although FIGS. 5-1~5-3 illustrate certain examples of the computing terminal 2 in application, the computing terminal 2 may include any appropriate user terminal with certain computing capabilities, such as a personal digital assistant (PDA), a personal computer (PC), a work station computer, a hand-held computing device (e.g., a tablet), a mobile terminal (e.g., a mobile phone or a smart phone), a TV or TV box, or any other user-side computing device, not limiting to specific sorts of devices.

The first audio acquisition module 101 may be arranged closer to the target sound source, commonly referring to a user's mouth, and configured to collect the desired voice signals. The second audio acquisition module 102 may be arranged away from the target sound source and configured to collect more of the noise signals. Above mentioned algorithm, using the reference audio signal collected by the second audio acquisition module 102 to process to the audio signals collected by the first audio acquisition module 101, will generate better result if the reference audio signals collected by the second audio acquisition module 102 contains less of the desired voice and/or if the audio signals collected by the first audio acquisition module 101 contains less noise signal. Consistent with the present disclosure, several strategies can be considered for a performance of the audio collecting/processing schemes to aid that the first audio acquisition module 101 is configured to capture the desired voice with a higher sensitivity and the ambient noise with a lower sensitivity and that the second audio acquisition module 102 is configured to do the contrary. In some embodiments, it can be considered to deploy directional microphones that have different sound-electric converting sensitivities towards different directions in the audio acquisition modules 101 and 102, but with different strategies: a max-sensitivity axis of the directional microphone(s) of the first audio acquisition module 101 pointed to a probable position of the desired sound source while avoiding those of the second audio acquisition module 102 from the probable position/orientation of the desired sound source. In some embodiments, as explained above, the number of the audio acquisition modules 101, 102 may be flexibly adjusted. For example, the at least two microphones of the audio acquisition module 101 and/or 102 may be arranged in different locations of the audio device 1 to form a so-called microphone array or lattice. Some of the multi-input audio processing algorithms, e.g., far-filed noise reduction algorithms and beam forming algorithms may be applied to enhance or attenuate (weaken) the audio signals from sound sources at different distances and/or different orientations. In some embodiments, the audio signals captured by the at least two microphones in the first audio acquisition module 101 may be processed to generate a processed audio signal that enhances the audio signals from the probable orientation of the target sound source and/or from short distances and attenuates (weakens) the other signals. Alternatively or integrally, the audio signals captured by the at least two microphones in the second audio acquisition module 102 may be processed to generate a processed audio signal that enhances the audio signals from non-probable orientations of the target sound source and/or from long distances.

In some embodiments, before or after generating the data stream, the microcontroller 103 or the computing terminal 2 may be further configured to process audio data collected from microphones of at least one of the microphone arrays to enhance the audio data from the a certain orientation with respect to the microphone array and weaken the audio data from another orientation that is different from the certain orientation.

In the embodiment shown in FIG. 5-1, the second audio acquisition module 102 may be formed or integrated with the microcontroller 103 and the device connector port 104 as a USB plug while the first audio acquisition module 101 is in a headset control box. In other embodiments, however, the microcontroller 103 may be deployed with the first audio acquisition module 1.

As shown in FIG. 5-1, the first audio acquisition module 101 may be connected with the microcontroller 103 in a wired communication. For that reason, the audio device 1 may further include a digital/analog cable 106 connecting the first audio acquisition module 101 with the second audio acquisition module 102 as shown in FIG. 5-1. At least one of the first audio acquisition module 101, the second audio acquisition module 102, or the microcontroller 103 may further include an analog-to-digital and digital-to-analog (AD/DA) converter (not shown) configured to convert analog audio signals into digital audio signals and/or digital audio signals into analog audio signals.

FIG. 5-2 shows an audio device 1 that includes the first audio acquisition module 101, the second audio acquisition module 102, the microcontroller 103, the device connector port 104, and the audio output module 105 (e.g., a speaker). In the audio device of FIG. 5-2, the first audio acquisition module 101 and the audio output module 105 may be formed or integrated as a headset 11, while the second audio acquisition module 102, the microcontroller 103, and the device connector port 104 may be formed or integrated as an audio adapter 12. The audio adapter 12 may be configured to connect with or be plugged into a compatible interface of the computing terminal 2. The headset 11 may further include an audio connector 110, compatible and connected with an audio connector port 111 included in the audio adapter 12. The audio connector may include a standard headset jack, such as a 3.5 mm analog headset jack, in Cellular Telecommunications Industry Association (CTIA) or Open Mobile Terminal Platform (OMTP) standard.

In some embodiments, in response to the headset 11 being connected with the audio adapter 12, the first audio acquisition module 101 may be configured to collect the first audio signals as the target sound data, while the second audio acquisition module 102 may be configured to collect the second audio signals as the reference sound data. The multi-input processing schemes may be applied to process the first and second audio signals to reduce the noises as explained above. In some embodiments, while the headset 11 is disconnected or unplugged from the audio adapter 12, the audio adapter 12, connecting to the computing terminal 2, may function independently. For example, the second audio acquisition module 102 of the audio adapter 12 may be configured to independently collect the second audio signals and send the second audio signals to the computing terminal 2 by itself.

As shown in FIG. 5-3, the first audio acquisition module 101 and the audio output module 105 may be formed or integrated as a wireless headset 13, while the second audio acquisition module 102 and the device connector port 104 may be formed or integrated as a wireless audio adapter 14. For example, the wireless audio adapter 14 may be an USB RF dongle. The microcontroller 103 (not shown) may be arranged in the wireless headset 13 or in the wireless audio adapter 14 according to an application. In the audio device of FIG. 5-3, the wireless headset 13 and the wireless audio adapter 14 may be coupled through a wireless connection between wireless antennas in the wireless headset 13 and the wireless audio adapter 14 respectively. The wireless connection may include a Radio Frequency (RF) connection, and the wireless headset 13 and the wireless audio adapter 14 may each include a RF communication interface for the RF connection. Either the wireless headset 13 or the wireless audio adapter 14 may further include an AD/DA converter configured to convert analog audio signals into digital audio signals and/or digital audio signals into analog audio signals. The device connector port 104 may include a physical interface to be connected with or plugged into a compatible interface of the computing terminal 2.

In some embodiments, in response to the wireless headset 13 being coupled with the wireless audio adapter 14, the first audio acquisition module 101 may be configured to collect the first audio signals as the target sound data, while the second audio acquisition module 102 may be configured to collect the second audio signals as the reference sound data. The multi-input processing schemes may be applied to process the first and second audio signals to reduce the noises as explained above. In some embodiments, while the wireless headset 13 is not coupled with the wireless audio adapter 14, the second audio acquisition module 102 in the wireless audio adapter 14 may independently collect the second audio signals and send the second audio signals to the computing terminal 2 by itself.

It can be understood that, consistent with the present disclosure, the first audio signals may be processed in reference to the second audio signals based on the multi-input audio processing scheme to generate the new audio signals that contains a more portion of audio signals from the target sound source than that in the audio signals collected from both of the first audio acquisition module 101 and the second audio acquisition module 102. In some embodiments, the audio system may include a first audio device and a second audio device. The first audio device may include the first audio acquisition module 101 that is configured to collect the first audio signals, while the second audio device may include the second audio acquisition module that is configured to collect the second audio signals.

As defined in the present disclosure, a same audio acquisition module may refer to at least one microphone on a same rigid body that has a fixed geometric dimension and the at least one microphone being arranged close to one another. In other words, a geometric relationship between two of the at least one microphone in a same audio acquisition module may be fixed. In one example, with the sound speed traveling in the atmosphere (i.e., 340 m/s) and a rate of 16 KHz (e.g., 1/16 millisecond) for sampling the audio signals, a typical distance between two of the at least one microphone in a same audio acquisition module may be of a centimeter order, such as 1~2 centimeters. The at least one microphone in a same audio acquisition module may form a lattice of microphones or a microphone array in configurations.

With respect to a same audio acquisition module on a rigid body, the applied multi-input processing schemes may include the beam forming algorithm. The beam forming algorithm, as used hereinafter, is a processing technique or an algorithm applied for determining characteristics of a sound source (e.g., orientations and distances between the microphones and the sound source) by evaluating a time difference of audio signals produced by a same sound source and received by different microphones on a same rigid body that has a fixed geometric dimension.

In contrast, two microphones between the audio acquisition modules 101, 102 may not have fixed geometric relationships. For example, when the first audio acquisition module 101 is coupled with the microcontroller 103 through a wireless connection, as shown in FIG. 5-3, the geometric relationships of the microphones between the audio acquisition modules 101, 102 may not be fixed and vary according to a user's physical position. In other words, the microphones between the audio acquisition modules 101, 102 are not considered on a same rigid body. As such, other multi-input audio processing schemes, such as the two-microphone noise reduction algorithm, may be applied to determine characteristics of a sound source and to reduce noises in the collected audio signals captured from the microphone(s) dedicated to collect target audio signals. The two-microphone noise reduction algorithm, as used hereinafter, is a processing technique or an algorithm specifically for processing audio signals collected by two microphone groups with non-fixed geometric relationships, namely not on a same rigid body.

In some embodiments, more than one of the multi-input audio processing schemes may be applied to an audio system. For example, the beam forming algorithm may be implemented prior to an application of the two-microphone noise reduction algorithm to accumulate the effect to reduce noises.

The multiple-input audio processing schemes may be totally or partly implemented through a DSP module locally in the audio device 1, in a manner similar to the arrangement of the DSP module with respect to the microcontroller in FIG. 1. The DSP module may be a hardware component connected with or embedded in the microcontroller 103, or a software application executed by the microcontroller 103. For example, the DSP module may include a micro-electronic circuit configured to accelerate calculations of an algorithm or a module embedded in the microcontroller 103.

In some embodiments, in consideration of cost saving and performance improving, the multi-input audio processing schemes may be implemented in the computing terminal 2 that is remote from the audio device 1. As shown in FIG. 2, the computing terminal 2 may be connected with the audio device 1 in a wired/wireless and real-time/non-real-time communication. The computing terminal, as used hereinafter, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device. In some embodiments, the computing terminal 2 may be configured to receive the data stream (i.e., the encoded audio signals) from the audio device 1. The computing terminal 2 may be configured to provide structures and functions correspondingly for related operations. In some embodiments, the computing terminal 2 may be configured to analyze the encoded data stream transmitted from the audio device 1 and implement related operations based on analysis results of the audio signals. In some embodiments, the audio device 1 may include a buffer component configured to buffer the encoded data stream and transmit the same to the computer device 2 in a non-real-time communication.

By immigrating the computing task to the computing terminal, the need of a high-performance processor or DSP chip arranged in the audio device can be eliminated, the requirement of a real-time processing system and exclusive occupation in processing the collected audio signals can be eliminated, and a stand-alone audio device with high costs and complex hardware can be turned into an accessory-level device. As consumer electronics represented by mobile phones, tablets, and laptops are prevailing in nowadays, it is very easy to find a host computing terminal with abundant calculation power available for such accessory-level audio device, without imposing extra hardware cost for end users, and deploy audio processing schemes on the computing terminal. Comparing to the processor deployed locally in a stand-alone audio device in the art, the computing power 2 provided by a host computing terminal can be much higher and offer additional capabilities of executing the multi-input audio processing schemes on a same data stream in parallel. The computing terminal 2 also has a more capacity to host audio processing algorithms that requires a huge calculation power and/or memory space than chip(s) embedded in audio device 1, notably in view of a capacity required by (Artificial intelligence) AI based audio processing algorithms which is rapidly developing nowadays. In some embodiments, the audio device 1 may further implement certain preprocessing schemes that do not consume high computing power, such as automatic gain control, and/or amplification.

The digital data stream may be transmitted, through the device connector port 104, to the computing terminal 2 for processing (e.g., decoding) the encoded audio signals based on the multi-input audio processing schemes. In view of the above, by immigrating complex computations to the computing terminal 2, the audio system of this configuration offers a solution to the problem of high hardware cost and high-power consumption in the existing technologies. Accordingly, the audio device 1 does not need to add a specific processing chip with high computing power.

The connection between the computing terminal 2 and the audio device 1 may be a wired connection or a wireless connection. The audio device 1 may be configured to support a wired/wireless communication protocol, such as USB data transfer protocol, Wi-Fi communication protocol, and/or Bluetooth communication protocol. In a wired connection, the device connector port 104 may include a physical interface to be connected with or plugged into a compatible interface of the computing terminal 2. In a wireless connection, the device connector port 104 and/or the microcontroller 103 may include a wireless communication module that supports one or more wireless data transfer protocol.

Turning back to FIG. 2, in some embodiments, the audio device 1 may further include an audio input port 107 and an audio output port 108. The microcontroller 103 may be configured to synchronously sample the audio signals collected from the audio acquisition modules 101, 102 at a portion of the audio input port 107 (i.e., sampling ports in the descriptions) based on a same clock signal of a fixed frequency or based on synchronized clock signals. In some embodiments, in response to the microcontroller 103 receiving to-be-played audio signals (may include multiple sound channels) that are transmitted from the computing terminal 2 through the device connector port 104, the microcontroller 103 may be configured to send the to-be-played audio signals to the audio output module 105 (an internally embedded in the audio device 1 or externally connected loudspeaker(s)) through the audio output port 108, and request the audio output module 105 to play the to-be-played audio signals.

In the art, when a loudspeaker(s) is used by the computing terminal 2 to output sound to ambience, there may exist a concern: the sounds played by loudspeaker(s) might interfere with the audio signals collected by microphone(s) in the audio device 1 or in computing terminal 2. In particular, it may occur when some of the microphone(s) is physically close to the loudspeaker(s). As a result, the microphones could be seriously interfered or even saturated by the sounds played by the loudspeaker(s). Instead, by directing the to-be-played audio signals to the audio output module 105 connected with the audio device 1, problems of the interference and saturation can be accordingly reduced. Such a configuration for outputting the to-be-played audio signals to the audio output module 105 is particularly useful when the audio device 1 is used in noisy environments.

In some embodiments, the audio output port 108 may be a standard audio socket compatible with a standard audio cable, such as 3.5 mm analog audio cable, and the audio device 1 may be connected with the audio output module 105 through the audio cable and the audio output port 108. Alternatively, the audio output port 108 may include an audio cable with a standard audio jack connector that may be directly plugged into an input of the external audio output module 105. The microcontroller 103 may optionally include one or more auxiliary output pins connected with the audio output port 108 (e.g., two pins for the left channel and right channel). When the audio device 1 is connected with the computing terminal 2, and when the audio output module 105 is connected with the audio output port 108, the microcontroller 103 may be configured to receive the audio data transmitted from the computing terminal 2 through the device connector port 104 (e.g., at the D+ and D− pins) and send the audio data to the audio output module 105 through the audio output port 108.

In some embodiments, the audio device 1 may further include a power source connector port (not shown). The power source connector port may include an interface configured for connecting the audio device 1 and a power source (not shown) in a wired or wireless manner. In some embodiments, the audio output port 108 may be physically located at a same side as the power source connector port. Such a configuration is useful for host devices (e.g., computing terminal 2) with only 1 external connector port (e.g., smart phones) without audio jack but still needs to be charged and connected with an external audio output module at the same time. It is also particularly useful for the audio device used in car or in conference call. Both the above-mentioned application scenarios require that the audio signals outputted from the computing terminal 2 to be played in volume large enough to be heard by a user(s). Without this configuration, a native loudspeaker(s) embedded in the computing terminal 2 are usually configured to play sounds, and these sounds would interfere with the audio signals collected by the microphones.

In some applications, the data stream may be processed by the computing terminal 2 after certain communication delay from the time when the audio signals were collected. The communication delay may be stable or unstable, ranging from milliseconds to a few seconds. In view of the above, consistent with the present disclosure, the collected audio signals may be encoded in a specific manner before sending to the computer terminal 2 to ensure that data decoded by the computing terminal 2 can provide accurate time difference information (i.e., time differences of audio signals produced by a same sound source and received by different microphones) regardless of whether certain information is lost in data transmissions and/or whether hardware delays exist.

The microcontroller 103 may be configured to sample and receive the audio signals from the audio acquisition module(s) process (e.g., encode) the collected audio signals to generate the data stream, and transmit the encoded data stream to the computing terminal 2 (e.g., through the device connector port 104), such that the computing terminal 2 may perform a corresponding operation based on the data stream.

In some embodiments, the microcontroller 103 may include a codec module configured for accepting multiple channels of analog signals and performing digital sampling and encoding of the input signals at the multiple channels in parallel. In some embodiments, the digital sampling may include analog-to-digital(A/D) conversion for converting analog signals and/or pulse-density modulation (PDM). Each microphone (in the audio acquisition modules 101, 102) may correspond to a separate sampling port (one of the audio input port 107) that operates independently and in parallel with other sampling port(s). The digital sampling rate for each microphone may be identical. That is, each microphone may be connected with the same and single microcontroller 103 at a corresponding sampling port, and the microcontroller 103 may be configured to sample the audio signal from each microphone using a same clock signal at a same rate or synchronized clock signals. For example, when the sampling rate is 16 kHz and the audio device includes four microphones in total, the microcontroller 103 may be configured to obtain four digital data points at each sampling period (e.g., $\frac{1}{16}$ millisecond).

In some embodiments, the microcontroller 103 may be configured to process (e.g., encode) the sampled audio signals from the audio acquisition module(s) in an alternate manner to generate the data stream. Specifically, assuming a total number of the microphones contained in the audio acquisition module(s) is denoted as n, immediately after encoding audio signals sampled from an ith microphone during m consecutive sampling periods (i.e., m data points), audio signals sampled from an (i+1)th microphone from same m consecutive sampling periods are encoded, where i is an integer ranging from 1 to n−1, and m is a positive integer, such as 3. Further, immediately after encoding audio signals sampled from an nth microphone (i.e., when i equals n), audio signals sampled from the first microphone from next m consecutive sampling periods are encoded.

For example, the audio device includes 4 microphones (i.e., n=4) and the encoding scheme is alternatively encoding sampled datapoints from the 4 microphones at every 3 consecutive sampling periods (i.e., m=3). The sampled data points from the 4 microphones at any sampling period may be denoted as At, Bt, Ct, and Dt, where t is a sequence number of the sampling period. The encoded data stream may include: A0A1A2B0B1B2C0C1C2D0D1D2 A3A4A5B3B4B5C3C4C5D3D4D5A6A7A8B6B7B8 . . . In another example, if the consecutive sampling period is 1 (i.e., m=1), the encoded data stream may include: A0B0C0D0A1B1C1D1A2B2C2D2A3B3C3D3A4B4C4D4.

In addition, the specific encoding format for each datapoint (e.g., A0 or B0) is not limited. Each datapoint may be an 8-bit data, a 16-bit data, or have another fixed bit size like pulse-code modulation (PCM) data. In some embodiments, the microcontroller 103 may be configured to compress multiple datapoints into one data capsule using a compressing scheme. For example, the audio device 1 includes 4 microphones and the encoding scheme is alternatively encoding sampled datapoints from the 4 microphones at every 3 consecutive sampling periods. Each capsule may include three consecutive sampled data from one microphone, such as A0A1A2 or B0B1B2. The capsules can be compressed using any compressing scheme suitable for the corresponding data points. The compressing scheme for different capsules may not be necessarily the same. The capsule that compressed A0A1A2 may have a size different from another size of the capsule that compressed B0B1B2. The capsules may be further encoded to the data stream using a similar interleaved manner. A specific marker may be added at the beginning and/or the end of each capsule to separate datapoints in a same capsule with others in the encoded data stream. For example, a comma may be added at the end of each capsule, and the encoded data stream may include: A0A1A2, B0B1B2, C0C1C2, D0D1D2, A3A4A5, B3B4B5, C3C4C5, D3D4D5.

As explained above, the audio signals collected by the microphones 101, 102 may be synchronously sampled at corresponding sampling ports of the microcontroller 103 based on a same clock signal of a fixed frequency or based on synchronized clock signals. The sampled digital audio signals may be encoded in an alternative/interleaved manner according to the sampling periods. Such configuration can ensure that the encoded data stream can be decoded to restore precise alignment of the multiple channels of the audio signals based on their sampling time sequences, even when there is a communication delay or packet loss during the communication. The accuracy can reach a range of microseconds. Such level of the precision enables an accuracy of the multi-input audio processing schemes for determining characteristics (e.g., orientation and/or distance) of sound source(s), enhancing signals from target sound source based on the characteristics, reducing signals from noise source based on the characteristics, etc.

Another advantage of the encoding scheme may include that the data stream can be packetized for asynchronous communication (such as USB data transfer). When communication congestion, delay, or even sporadic packet loss occurs, the encoded data stream can still restore precise alignment of the multiple channels of the audio signals based on their sampling time sequences, and the performance of the multi-input audio processing schemes is not significantly affected. For example, an encoded data stream includes: A0B0C0D0A1B1C1D1A2B2C2D2A3B3C3D3 A4B4C4D4. The encoded data stream may be packaged into data packets in the unit of datapoints corresponding to same sampling periods. That is, for four microphones, At, Bt, Ct, and Dt are considered as one unit. Each data packet may include two units of datapoints. Assuming data packet describing the two units of A2B2C2D2A3B3C3D3 is lost during communication, the decoded data stream can still align the four channels using the remaining data packets: A0B0C0D0A1B1C1D1A4B4C4D4 without affecting the relative time sequences among different data packets. If the sampled audio signals were separately transmitted and not encoded in the disclosed interleaved encoding scheme, the computing terminal 2 would not be able to restore the precise alignment of the audio data points according to their sampling time sequence.

In view of the above, the data stream may include digitalized audio signals converted and encoded by the microcontroller 103 directly from the collected audios signals. The microcontroller 103 may be configured to generate the data stream by encoding the audio signals collected by the audio acquisition modules using the specific encoding strategy to preserve the information about the specific microphone that collected each audio data point and to ensure audio data points collected at the same time by different microphones can be accurately recreated without breaking or mismatching the original time sequences of audio signals collected by different microphones. The computing terminal 2 can, based on the data stream, reconstruct the audio signals collected by different microphones in a synchronous time frame.

As mentioned above, the microcontroller 103 may be configured to perform a preset signal processing scheme on the audio signals collected from the audio acquisition modules to produce processed signals and encode the processed signals into the data stream. As explained above, for example, the audio signals captured by the at least one microphone in the first audio acquisition module 101 may be processed to generate a processed audio signal that enhances the audio signals from the probable orientation of the target sound source and/or from short distances and attenuates (weakens) the other signals. Alternatively or integrally, the audio signals captured by the at least one microphone in the second audio acquisition module 102 may be processed to generate a processed audio signal that enhances the audio signals from non-probable orientations of the target sound source and/or from long distances.

Under some scenarios, the audio signals may be collected by the microphones simultaneously while to-be-played audio signals is being played. In particular, for many audio apparatuses, especially those used for online communication or conference calls, audio acquiring components (e.g., microphones) and audio casting components (e.g. speakers) are normally adjacent in their geometric positions. As a result, it may easily occur that the audio signals being played by the speaker(s) is simultaneously captured by the microphones of a same audio apparatus. That is, the audio signals acquired by microphones may contain a combination of sounds both from a target sound source and from a speaker(s). This is so-called "echo." The "echo" phenomenon is often unfavorable in audio data processing. Echo can be considered as a part of ambient noises that affect a correct interpretation/comprehension of audio signals collected from the target sound source.

As shown in FIG. 2 the audio device 1 may include the audio output port 108. In response to the microcontroller 103 receiving the to-be-played audio signals (may correspond to the multiple sound channels) that are transmitted from the computing terminal 2 through the device connector port 104, the microcontroller 103 may be configured to send the to-be-played audio signals to the audio output module 105 through the audio output port 108, and request the audio output module 105 (i.e., a loudspeaker(s)) to play the to-be-played audio signals simultaneously while the microcontroller 103 is sampling the audio signals from the audio acquisition module(s).

To solve the echo issues, with respect to the data collected by the audio acquisition module(s), the present disclosure may further perform a modified encoding scheme prior to sending the audio signals to the computer terminal 2. Assuming that a total number of the microphones contained in the audio acquisition modules is denoted as n, m is a positive integer that indicates a number of consecutive sampling periods, and the to-be-played audio signals include k sound channels to be played in k loudspeakers, the encoding scheme is implemented as: 1) the microcontroller 103 may be configured to encode audio signals sampled from a 1st microphone from the microphones during m consecutive sampling periods (i.e., corresponding to m data points); 2) immediately after encoding audio signals sampled from an ith microphone during m consecutive sampling periods, audio signals sampled from an (i+1)th microphone during same m consecutive sampling periods are encoded, where i is an integer ranging from 1 to n−1; 3) immediately after encoding audio signals sampled from an nth microphone (i.e., the last microphone from the audio acquisition modules), instead of sampling audio signals from the first microphone during next m consecutive sampling periods, the microcontroller 103 may be configured to encode, in a sequential order, the to-be-played audio signals including the k sound channels during same m consecutive sampling periods; 4) when one cycle of the above steps is completed, the microcontroller 103 may be configured to start encoding audio signals sampled from the first microphone during next m consecutive sampling periods; and repeat encoding steps 2) 3) 4) for next m consecutive sampling periods as another cycle (iteration) and so forth.

For example, the audio device 1 may include 4 microphones (i.e., n=4), the to-be-played audio signals include 2 channels (i.e., k=2), and the encoding scheme alternatively encodes sampled data points from the 4 microphones plus the 2 to-be-played sound channels at every 3 consecutive sampling periods (i.e., m=3). The sampled data points from the 4 microphones at any sampling period are denoted respectively as At, Bt, Ct, Dt, and the data points sampled from the 2 to-be-played sound channels at any sampling period are denoted respectively as Et, Ft, where t is a sequence number of the sampling periods. In this scenario, the encoded data stream may include:
A0A1A2B0B1B2C0C1C2D0D1D2E0E1E2F0F1F2A3A4 A5B3B4B5C3C4C5D3D4D5E3E4E5F3F4F5A6A7A8 B6B7B8 . . . and so on. In another example, assuming that only 2 microphones are connected with the microcontroller 103 (i.e., n=2), the to-be-played audio signals include mono-channel (i.e., k=1), and the consecutive sampling period is 1 (i.e., m=1), the encoded data stream may include: A0B0E0A1B1E1A2B2E2A3B3E3A4B4E4 . . . and so on.

Similar to the encoding scheme as mentioned above, an encoding format for each datapoint (e.g., A0, B0, or E0) is not limited. Each datapoint may be an 8-bit data, a 16-bit data, or have another fixed bit size like pulse-code modulation (PCM) data. In some embodiments, the microcontroller 103 may be configured to compress multiple datapoints into one data capsule using a compressing scheme. For example, the audio device 1 includes 4 microphones, the to-be-played audio signals includes 2 channels, and the encoding scheme is alternatively encoding sampled datapoints from the 4 microphones and the 2 channels at every 3 consecutive sampling periods. Each capsule may include three consecutive sampled data from one microphone, or three consecutive sample to-be-played audio data corresponding to one channel, such as A0A1A2, B0B1B2, or E0E1E2. The capsules can be compressed using any compressing scheme suitable for the corresponding data points. The compressing scheme for different capsules may not be necessarily the same. The capsule that compressed A0A1A2 may have a size different from another size of the capsule that compressed B0B1B2 or E0E1E2. The capsules may be further encoded to generate the data stream using a similar interleaved manner. A specific marker may be added at the beginning and/or the end of each capsule to separate datapoints in a same capsule with others in the encoded data stream. For example, a comma may be added at the end of each capsule. The encoded data stream may include: A0A1A2, B0B1B2, C0C1C2, D0D1D2, E0E1E2, F0F1F2, A3A4A5, B3B4B5, C3C4C5, D3D4D5. . .

In some embodiments, the audio signals collected by the audio acquisition module(s) and the to-be-played audio signals may be synchronously sampled at corresponding ports of the microcontroller 103 based on a same clock signal of a fixed frequency or based on synchronized clock signals. The sampled digital audio signals are strictly encoded in an alternative/interleaved manner according to the sampling periods. Such configuration can ensure that the encoded data stream can be decoded to restore precise alignment of the multiple channels of the audio signals based on their sampling time sequences, even when there is a communication delay or packet loss during the communication. The accuracy can reach a range of microseconds. Such level of precision and accuracy enables the computing terminal 2 to implement the multi-input audio processing schemes for determining characteristics (e.g., orientation and/or distance) of sound source(s), enhancing signals from target sound source based on the characteristics, reducing signals from noise source based on the characteristics, etc.

Similarly, another advantage of the encoding scheme may include that the data stream can be packetized for asynchronous communication (such as USB data transfer). When communication congestion, delay, or even sporadic packet loss occurs, the decoded data stream can still restore precise alignment of the multiple channels of the audio signals based on their sampling time sequences, and the performance of the multi-input audio processing schemes is not significantly affected.

Figure 6:
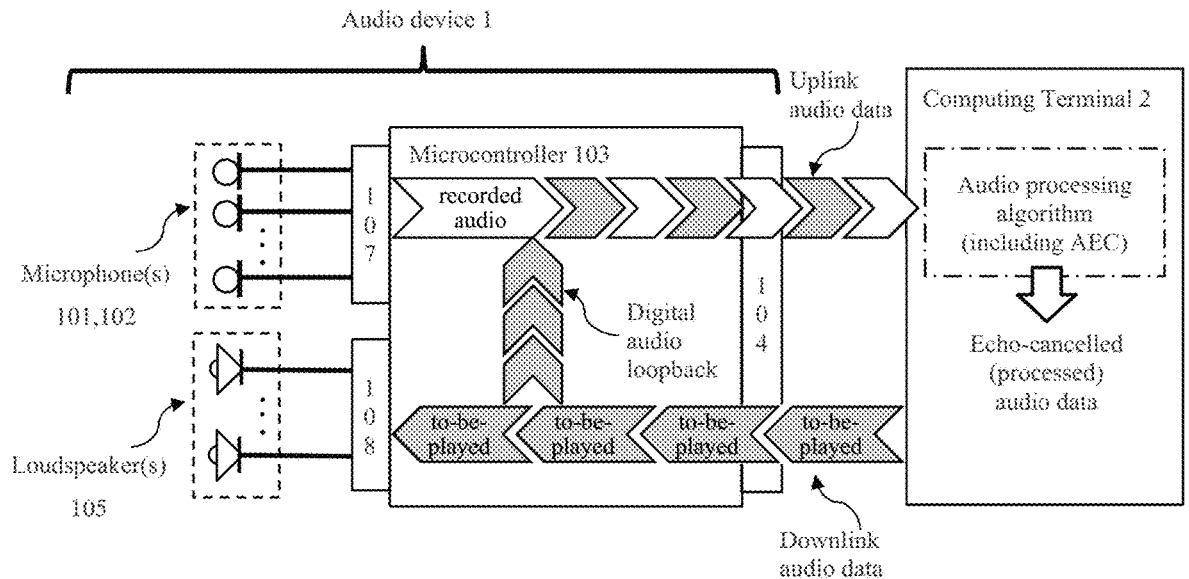
FIG. 6 illustrates an implementation of an encoding scheme to an audio system according to the present disclosure.

FIG. 6 illustrates an implementation of an encoding scheme to an audio system according to the present disclosure. As shown in FIG. 6, the audio system may include an audio device 1 and a computing terminal 2. A microcontroller 103 of the audio device 1 may be configured to continuously sample the to-be-played audio signals transmitted from the computing terminal 2 through the device connector port 104 and the audio signals captured from the audio acquisition module(s) through the sampling ports. In some embodiments, the microcontroller 103 may take continuous snapshots of the to-be-played audio signals (forwarded from the downlink audio data and shown in the bold arrows in FIG. 6), and the audio signals captured from the audio acquisition module(s) through the sampling ports of the audio input port 107. Further, the microcontroller 103 may be configured to process(e.g., encode) these sampled audio signals into one data stream and transmit (shown as the uplink audio data in FIG. 6) to the computing terminal 2 through the device connector port 104 for later processing in the computing terminal 2.

It should be noted that FIG. 6 only demonstrates one simplified illustration, in which the audio system includes a single uplink data channel and a single downlink data channel. In some embodiments, however, the audio system may include more than one uplink channels each corresponding to one of the audio acquisition module(s), and/or more than one downlink channels each corresponding to one of the multiple speakers 105. Further, the audio device 1 may or may not include the speaker(s) 105. In some examples, the speaker(s) 105 may be remote from and externally connected with the audio device 1.

Figure 7:
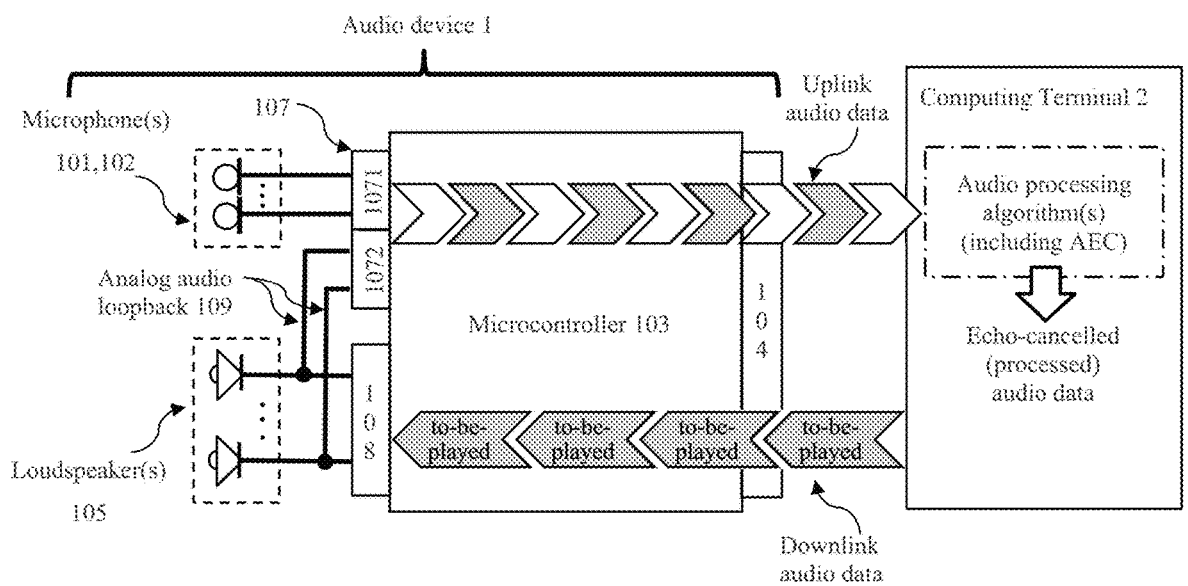
FIG. 7 illustrates another implementation of the encoding scheme to an audio device according to the present disclosure.

FIG. 7 illustrates another implementation of the encoding scheme to an audio device according to the present disclosure. The microcontroller 103 may be configured to sample k-channel to-be-played audio signals corresponding to k audio output ports 108 (connected with k speakers 105 respectively) and sample audio signals from n microphones 101, 102 through n audio sampling ports 1071 (in the audio input port 107). Assuming that the microcontroller 103 includes at least n+k audio sampling ports (i.e., 1071 and 1072 in FIG. 7). The n+k audio sampling ports may be analog ports or digital ports. A 1st sampling port to an nth sampling port (i.e. 1071 in FIG. 7) in the audio input port 107 may be configured to sample the audio signals from the n microphones and function as the n audio sampling ports 1071. An (n+1)th sampling port to an (n+k)th sampling port (i.e., 1072 in FIG. 7) may be configured to link, e.g., through an external digital or analog circuit, to the k audio output ports 108 that are arranged in parallel with the loudspeakers respectively. As such, the microcontroller 103 may sample all the audio signals and the to-be-played audio signals from the n+k audio sampling ports (1071, 1072) in an interleaving manner. In some embodiments, when the audio input port 107 and the audio output port 108 only include analog signals, the sampling may be implemented simply by linking the k audio output port 108 to the (n+1)th to (n+k)th sampling ports 1072 of the audio input port 107 by a wire(s) 109, as shown in FIG. 7.

It can be understood that, although FIGS. 6 and 7 show both of the first and second audio acquisition modules in the audio device 1, the audio device 1 of FIGS. 6 and 7 may be equipped with only one of the first and second audio acquisition modules. The above-described encoding scheme(s) as explained above may be applied to the audio device with either the first audio acquisition module or the second audio acquisition module.

By applying the above-described encoding schemes, the audio system according to the present disclosure provides a short and stable latency. Accordingly, the generated data stream may be further processed with certain of the multi-input audio processing schemes that require precise timing alignments, such as the AEC technique mentioned above. AEC is an algorithm can suppress a sound being played by an apparatus from which the sound was captured. The AEC algorithm strictly requires the to-be-played audio signals as played by the speaker(s) highly aligned with the audio signals recorded by the microphone(s), so that the to-be-played audio signals may be removed from the target sound signals.

Figures 1, 8:
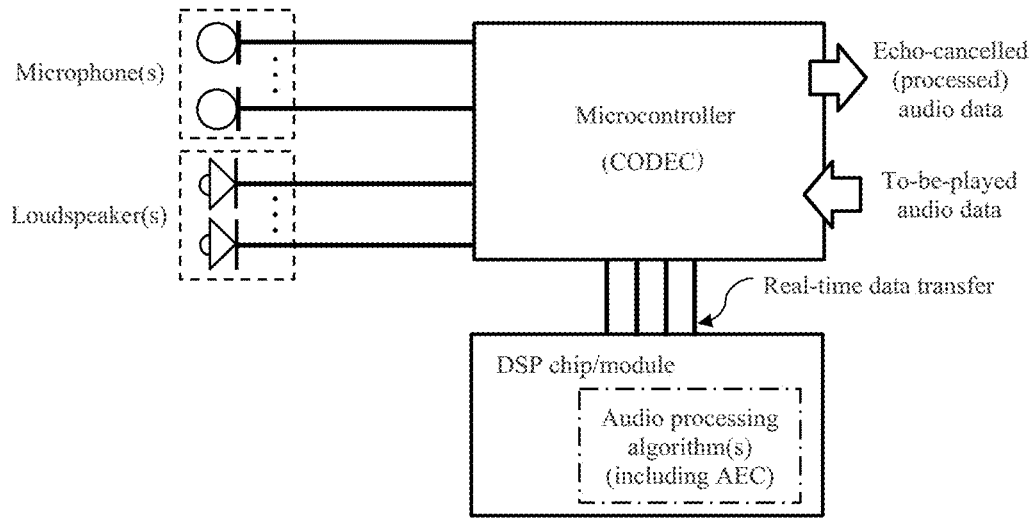
Figures 2, 8:
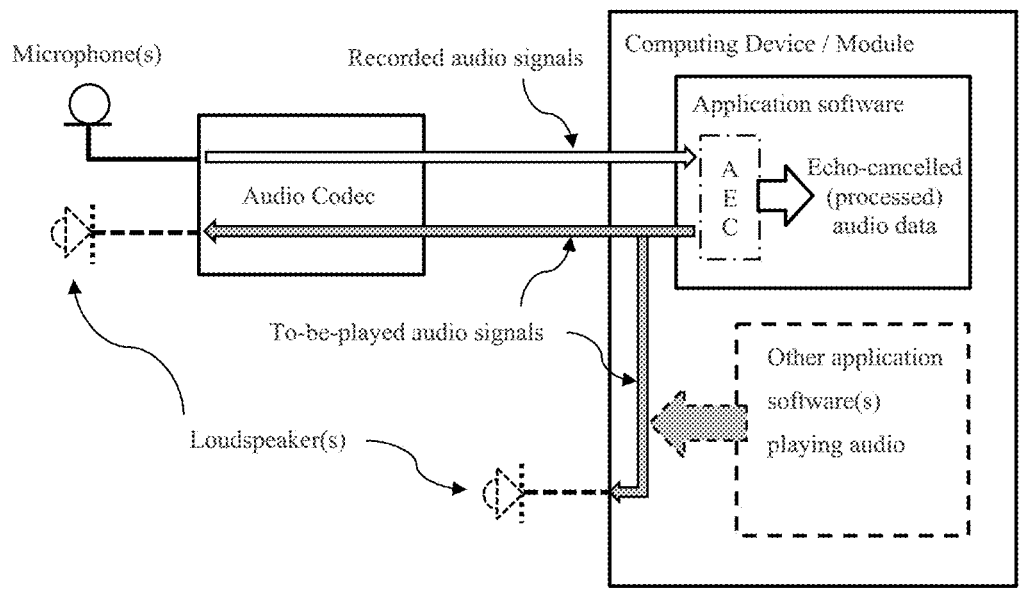

In the art, as shown in a first audio system of FIG. 8-1, however, AEC is implemented in an internal on-chip DSP module or an external DSP module connected with the microcontroller. This is called "front-end AEC." In this configuration, however, the DSP module requires extra cost, consumes power, generates heat, and occupies space, and there also exists a dilemma between cost/consumption/size and performance in selecting the DSP module.

In another example in the art, as shown in a second audio system of FIG. 8-2, AEC is implemented in an application software running on a computing terminal. In this configuration, AEC is required to obtain the to-be-played audio signals from an operating system of the computing terminal while the audio signals are sampled and sent by the audio device. As a result, it can hardly obtain the to-be-played audio signals accurately aligned in time with the sampled audio signals from the audio device. This problem of mis-alignment may result from a latency that includes various delay components, for example, upstream plus downstream transmission delays between the computing terminal and the microcontroller in the audio device; and/or a processing delay in the operating system of the computing terminal, etc. As the computing terminal is governed by a multi-thread non-real time operating system, such a latency is therefore not stable and difficult to be determined. A non-stable latency between signals will ruin a performance of AEC. Therefore, in the art, the software AEC implemented in a multi-thread non-real-time computing terminal is of compromised performance.

By the above modified encoding scheme, however, even when the data stream being transmitted in an asynchronous manner with non-stable latency, a precise alignment between the to-be-played audio signals and the audio signals can still be restored in the computing terminal, because a latency, e.g. between the data points A0/B0/E0, comes only from a processing delay caused by the microcontroller. Such a system can be considered as a real-time machine. Accordingly, AEC can be implemented in the computer terminal instead of configuring the microcontroller or adding a DSP module in the audio device to do so (the front-end AEC). Correspondingly, AEC may be migrated to the computing terminal that may include a powerful CPU with an available DSP resource. Accordingly, a system with higher performance, higher stability, and lower costs can be guaranteed regardless of whether the data stream is transmitted in a synchronous or asynchronous manner.

In some embodiments, an audio system including the audio device 1 and computing terminal 2 is provided. The audio system may implement some or all the features described in the present disclosure. The audio device 1 may include a microcontroller 103 and at least two audio acquisition modules 101, 102 configured to collect audio signals. Each of the audio acquisition modules 101, 102 may be respectively connected with the microcontroller 103. The microcontroller 103 may be configured to process the audio signals collected by the audio acquisition modules 101, 102 to generate one data stream. When the audio device 1 is connected with the computing terminal 2, the microcontroller 103 may be configured to send the data stream to the computing terminal 2 for later processing. The computing terminal 2 may be configured to decode the data stream and reconstruct the audio signals, implement the multi-input audio processing scheme(s) to obtain one or more enhanced audio signal, and perform an operation based on a result of voice recognition of the enhanced audio signal.

As disclosed herein, the disclosed methods and the audio system may be accomplished by other means. The audio device and the computing terminals as depicted above in accordance with various embodiments are exemplary only. For example, the disclosed modules/units can be divided based on logic functions. In actual implementation, other dividing methods can be used. For instance, multiple modules or units can be combined, formed, or integrated into another system, or some characteristics can be omitted or not executed, etc.

When the integrated modules/units as disclosed above are implemented in the form of software functional unit(s) and sold or used as an independent product, the integrated units can be stored in a computer readable storage medium. Therefore, the whole or part of the essential technical scheme of the present disclosure can be reflected in the form of software product(s). The computer software product(s) can be stored in a storage medium, which can include a plurality of instructions to enable a computing device (e.g., a mobile terminal, a personal computer, a server, a network device, etc.) to execute all or part of the steps as disclosed in accordance with various embodiments of the present disclosure. The storage medium can include various media for storing programming codes including, for example, U-disk, portable hard disk, ROM, RAM, magnetic disk, optical disk, etc.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An audio device, comprising:
at least one first microphone arranged near a desired sound source and configured to collect first audio signals,
at least one second microphone arranged away from the desired sound source and configured to collect second audio signals;
a microcontroller configured to process and encode the first audio signals and the second audio signals in an interleaving manner according to an encoding scheme to generate a data stream; and a device connector port compatible with a computing terminal and configured to connect with the microcontroller in a wired/wireless communication for transmitting the data stream to the computing terminal, wherein:

each of the at least one first microphone and the at least one second microphone is connected with the microcontroller in a respective wired/wireless communication;

the microcontroller is configured to synchronously sample the first audio signals and the second audio signals in parallel at a first moment;

based on the data stream, the first audio signals are processed in reference to the second audio signals to generate new audio signals;

data sampled from the first audio signals at the first moment and data sampled from the second audio signals at the first moment are arranged in adjacent positions in the data stream such that a precise alignment is restored between the first audio signals and the second audio signals based on their sampling time sequences when decoding the encoded data, to enhance signals from target sound source and reduce signals from noise source.

2. The audio device of claim 1, wherein:
the microcontroller is configured to send, through the device connector port, the data stream to the computing terminal using a Universal Serial Bus (USB) data transfer protocol, and
the device connector port is compatible with a USB port of the computing terminal.

3. The audio device of claim 1, wherein:
the computing terminal includes at least a portion of the at least one second microphone configured to communicate with the microcontroller through the device connector port.

4. The audio device of claim 1, wherein:
the at least one microphone of the at least one first microphone includes a plurality of first microphones that are arranged into a microphone array, and/or
the at least one microphone of the at least one second microphone includes a plurality of second microphones that are arranged into a microphone array.

5. The audio device of claim 4, wherein:
the microcontroller or the computing terminal is further configured to process audio data collected by the plurality of first microphones and/or the plurality of second microphones to enhance a portion of the collected audio data from a first orientation with respect to at least one of the microphone arrays and weaken another portion of the collected audio data from a second orientation different from the first orientation.

6. The audio device of claim 1, wherein:
the at least one second microphone and the microcontroller are formed into a physical body, and
the microcontroller is connected with the at least one first microphone and the device connector port in a respective wired/wireless communication.

7. The audio device of claim 6, wherein the physical body further includes the device connector port.

8. The audio device of claim 7, further comprising at least one audio output module that is connected with the microcontroller via a wired/wireless communication.

9. The audio device of claim 8, wherein:
the audio device includes a wired/wireless headset, and
the at least one first microphone is arranged in a headset control box or a headset microphone stick of the wired/wireless headset.

10. The audio device of claim 1, wherein:
the at least one first microphone and the microcontroller are formed into a first physical body,
the at least one second microphone and the device connector port are formed into a second physical body, and
the first physical body and the second physical body are connected in a wired/wireless communication.

11. The audio device of claim 1, wherein:
the at least one second microphone is a first one of the at least one second microphone, and the audio device further includes a second one of the at least one second microphone,
the second one of the at least one second microphone is connected with the microcontroller in a wired/wireless communication, and
the first one of the at least one second microphone is configured to communicate with the microcontroller through the device connector port.

12. The audio device of claim 1, wherein:
the first audio signals and the second audio signals are encoded according to an encoding scheme that includes:
encoding audio signals captured from an $(i+1)^{th}$ microphone during m consecutive sampling periods immediately after encoding audio signals captured from an $i^{th}$ microphone during m consecutive sampling periods; and
encoding audio signals captured from a first microphone during next m consecutive sampling periods immediately after encoding audio signals captured from an $n^{th}$ microphone during m consecutive sampling periods,
wherein:
n is a total number of the at least one microphone of the at least one first audio acquisition module and the least one microphone of the at least one second audio acquisition module,
the at least one microphone includes the $i^{th}$ microphone and the microphone,
i is an integer ranging from 1 to n−1, and
m is a positive integer.

13. An audio device, adapted to selectively connect with another audio device that includes at least one first microphone configured to collect first audio signals, the audio device comprising:
at least one second microphone configured to collect second audio signals;
a microcontroller configured to process and encode the first audio signals and the second audio signals in an interleaving manner according to an encoding scheme to generate a data stream;
an audio connector port configured to selectively connect with the other audio device in a wired/wireless communication; and
a device connector port compatible with a computing terminal and configured to connect with the microcontroller in a wired/wireless communication for transmitting the data stream to the computing terminal, wherein:
the microcontroller is configured to synchronously sample the first audio signals and the second audio signals in parallel at a first moment;

based on the data stream, the first audio signals are processed in reference to the second audio signals to generate new audio signals;

data sampled from the first audio signals at the first moment and data sampled from the second audio signals at the first moment are arranged in adjacent positions in the data stream, such that a precise alignment is restored between the first audio signals and the second audio signals based on their sampling time sequences when decoding the encoded data to enhance signals from target source and reduce signals from noise source.

14. The audio device of claim 13, wherein:
in response to the other audio device being disconnected from the audio device, the microcontroller is configured to send the second audio signals to the computing terminal.

15. The audio device of claim 13, wherein:
the microcontroller is configured to send, through the device connector port, the data stream to the computing terminal using a Universal Serial Bus (USB) data transfer protocol, and
the device connector port is compatible with a USB port of the computing terminal.

16. The audio device of claim 13, wherein:
the first audio signals and the second audio signals are encoded according to an encoding scheme including:
encoding audio signals captured from an (i+1) microphone during m consecutive sampling periods immediately after encoding audio signals captured from an $i^{th}$ microphone during m consecutive sampling periods; and
encoding audio signals captured from a first microphone during next m consecutive sampling periods immediately after encoding audio signals captured from an $n^{th}$ microphone during m consecutive sampling periods,
wherein:
n is a total number of the at least one microphone of the other audio device and the at least one microphone of the at least one audio acquisition module,
the at least one microphone of the other audio device and the at least one microphone of the at least one audio acquisition module include the $i^{th}$ microphone and the $n^{th}$ microphone,
i is an integer ranging from 1 to n−1, and
m is a positive integer.

17. An audio device, adapted to connect, via at least one audio output port, with at least one loudspeaker that is configured to play a downlink data stream containing to-be-played audio signals, the audio device comprising:
at least one microphone configured to collect audio signals;
a microcontroller configured to encode the collected audio signals and the to-be-played audio signals in an interleaving manner according to an encoding scheme to generate an uplink data stream; and
a device connector port, connected with the microcontroller in a wired/wireless communication, compatible with a computing terminal and configured to receive the downlink data stream from the computing terminal and transmit the uplink data stream to the computing terminal,
wherein data sampled from the collected audio signals at a first moment and data sampled from the to-be-played audio signals at the first moment are arranged in adjacent positions in the data stream such that a precise alignment is restored between the collected audio signals and the to-be-played audio signals based on their sampling time sequences when decoding the encoded data to enhance signals from target sound source and reduce signals from acoustic echo.

18. The audio device of claim 17, wherein the interleaving encoding manner includes:
encoding, in a sequential order, the audio signals captured from n microphone(s) in the at least one microphone each during m consecutive sampling periods; and
after or before encoding the audio signals captured from the n microphone(s), encoding, in a sequential order, the to-be-played audio signals corresponding to k sound output channels each during m consecutive sampling periods,
wherein:
n is a total number of the at least one microphone,
m is a positive integer, and
k is a total number of the sound channels corresponding to the to-be-played audio signals.

19. The audio device of claim 17, wherein:
the audio device further includes an audio input port having a plurality of audio sampling ports,
the at least one microphone is connected to a first portion of the audio sampling ports,
a second portion of the audio sampling ports is each connected with one of the at least one audio output port arranged in parallel with the at least one loudspeaker, the second portion of the audio sampling ports being different from the first portion of the audio sampling ports, and
the microcontroller is further configured to encode audio data sampled from the first portion and the second portion of audio sampling ports in a sequential order according to the interleaving manner to generate the uplink data stream.

20. The audio device of claim 17, wherein the microcontroller is further configured to capture digital audio output data points from the downlink data stream in response to the microcontroller sampling audio input data points from the at least one audio acquisition module, the microcontroller being further configured to encode the digital audio output data points and the audio input data points in the interleaving manner to generate the uplink audio data stream.

* * * * *